United States Patent [19]

Kong

[11] Patent Number: 5,465,337
[45] Date of Patent: Nov. 7, 1995

[54] METHOD AND APPARATUS FOR A MEMORY MANAGEMENT UNIT SUPPORTING MULTIPLE PAGE SIZES

[75] Inventor: Shing I. Kong, Menlo Park, Calif.

[73] Assignee: Sun Microsystems, Inc., Mountain View, Calif.

[21] Appl. No.: 318,539

[22] Filed: Oct. 5, 1994

Related U.S. Application Data

[63] Continuation of Ser. No. 929,792, Aug. 13, 1992, abandoned.

[51] Int. Cl.[6] .............................. G06F 12/10; G06F 12/00
[52] U.S. Cl. ................................... 395/417; 364/DIG. 1; 364/256.3; 364/256.4; 364/259.2; 364/259.7; 395/416; 395/421.1; 395/421.11
[58] Field of Search ....................................... 395/400, 425

[56] References Cited

U.S. PATENT DOCUMENTS

| | | | |
|---|---|---|---|
| 4,356,549 | 10/1982 | Chueh | 395/400 |
| 4,731,740 | 3/1988 | Eguchi | 395/400 |
| 4,774,653 | 9/1988 | James | 395/400 |
| 4,992,936 | 2/1991 | Katada et al. | 395/400 |
| 5,133,058 | 7/1992 | Jenson | 395/400 |
| 5,263,140 | 11/1993 | Riordan | 395/400 |

*Primary Examiner*—Eddie P. Chan
*Assistant Examiner*—Reginald G. Bragdon
*Attorney, Agent, or Firm*—Blakely Sokoloff Taylor & Zafman

[57] ABSTRACT

A memory management unit for translating a virtual address into a corresponding physical address including a translation lookaside buffer and a comparator. The translation lookaside buffer includes a plurality of entries, each of the entries having a first number of bits to indicate a virtual page number, a second number of bits to indicate an offset into the page, a third number of bits to indicate either a portion of a page number or a portion of an offset value, a fourth number of bits to indicate a page size, and a fifth number of bits for storing a physical address of a page of memory. The comparator compares a number of bits equal to the virtual page size of a virtual address presented to the translation lookaside buffer with the virtual addresses stored in entries of the translation lookaside buffer. If the result of the comparison produces a match/hit, the physical address is concatenated with the bits of the second and third number of bits using the stored page size to provide a physical address. When the comparison produces a miss, an assumed page size is used to access a table in memory from which the physical addresses may be derived.

12 Claims, 4 Drawing Sheets

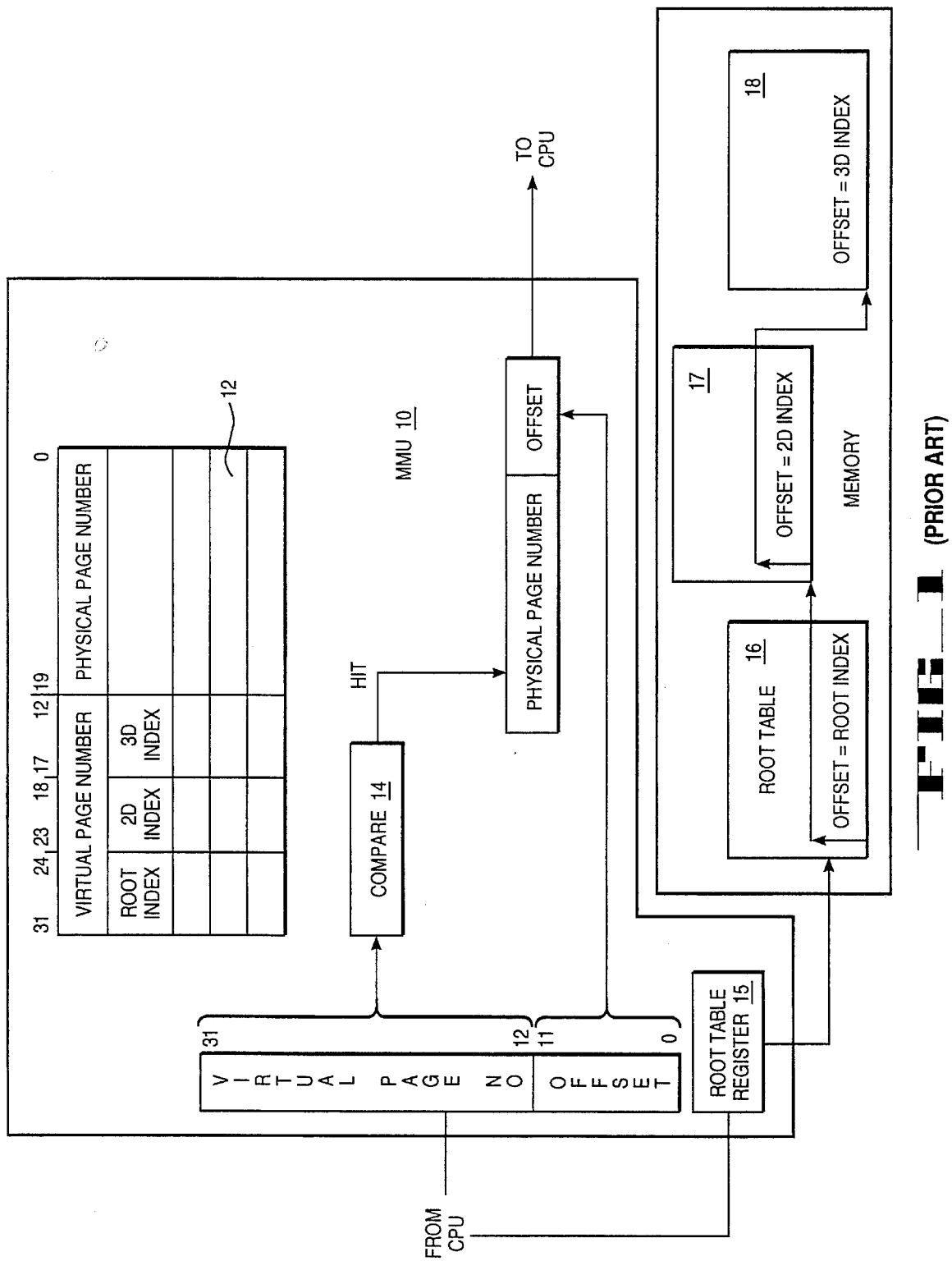
FIG_1 (PRIOR ART)

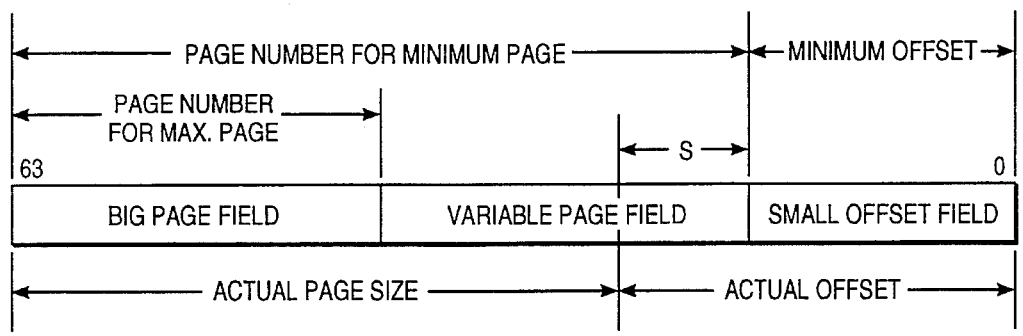
FIG_2
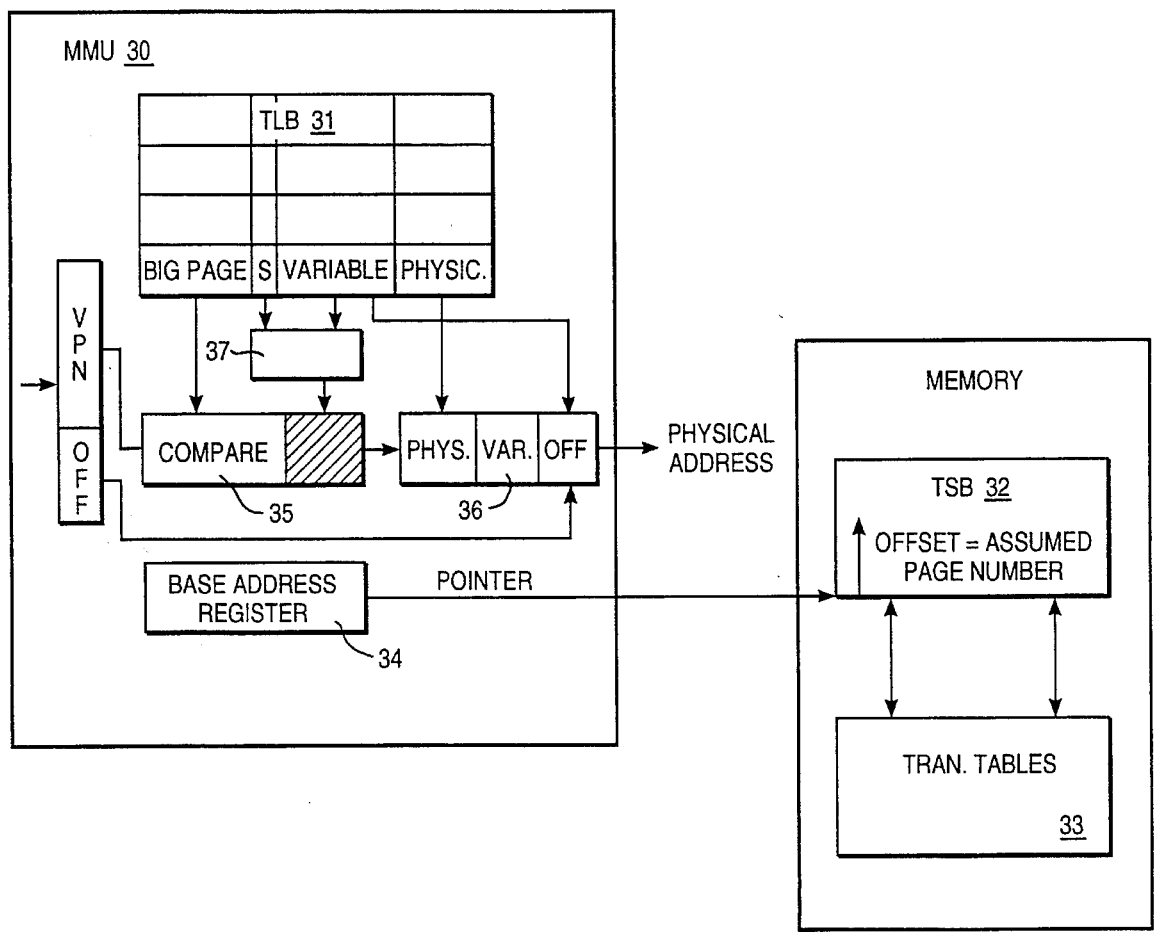
FIG_3

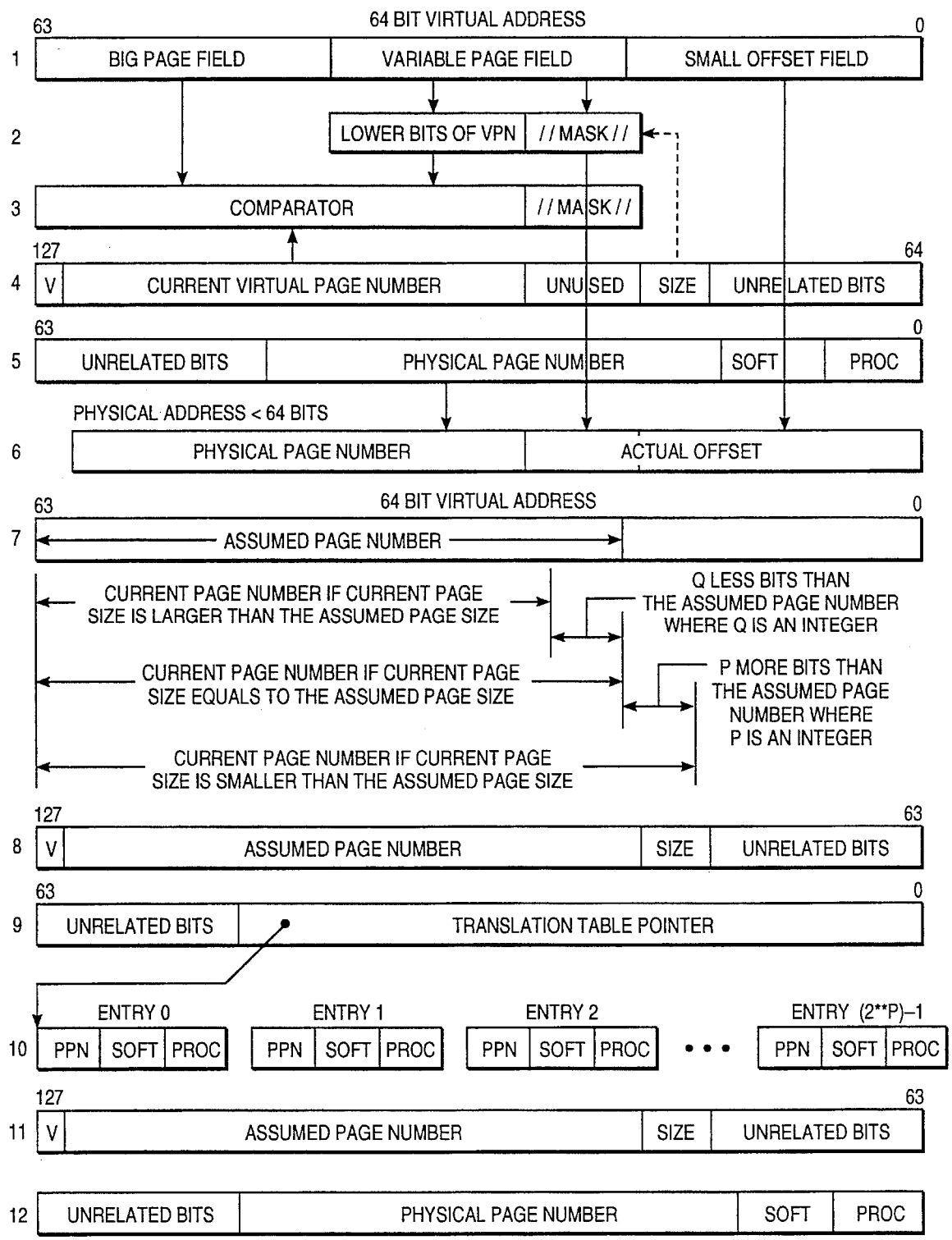
FIG_4

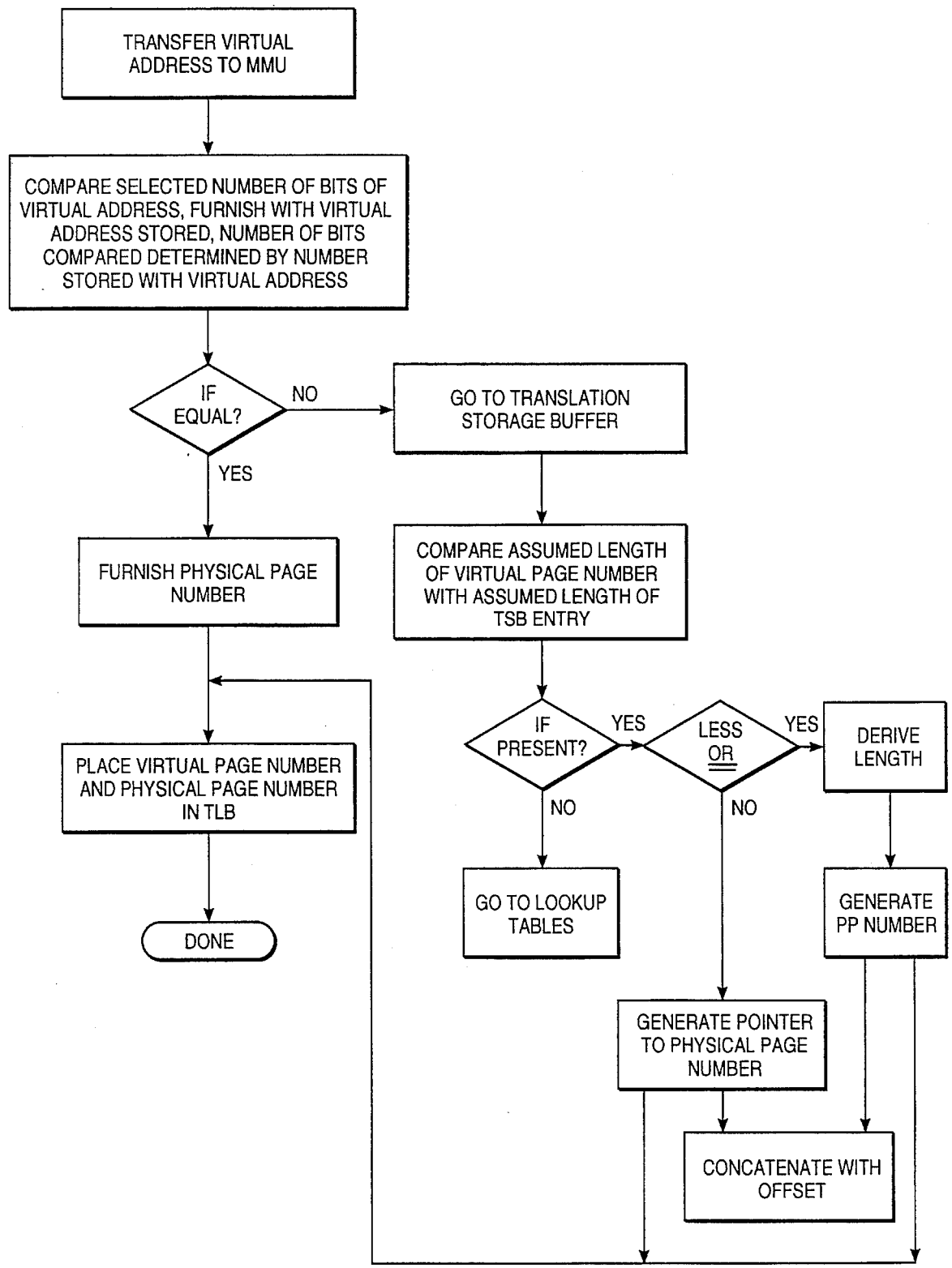
FIG_5

METHOD AND APPARATUS FOR A MEMORY MANAGEMENT UNIT SUPPORTING MULTIPLE PAGE SIZES

This is a continuation of application Ser. No. 07/929,792 filed Aug. 13, 1992, now abandoned.

BACKGROUND OF THE INVENTION

1. Field of the Invention

This invention relates to virtual memory systems and, more particularly, to memory management units for controlling the translation of addresses between virtual and physical memory.

2. History of the Prior Art

Two general trends have coincided in the development of computer systems. The first is that the addressable memory available to a computer has grown larger so that the computer may handle more information and larger, more sophisticated programs. The second is that the speed of operation of a computer has increased so that larger programs may be run in a reasonable time.

One of the ways in which the addressable memory of a computer has been increased is through the use of virtual memory systems. A virtual memory system allows addressing of very large amounts of memory as though all of that memory were a part of the main memory of the computer system. A virtual memory system allows this even though actual main memory may consist of some substantially lesser amount of storage space than is addressable. For example, main memory may consist of one megabyte of random access memory while sixty-four megabytes of memory are addressable using the virtual memory addressing system.

Virtual memory systems accomplish this feat by providing memory management units which translate virtual memory addresses into the physical memory addresses at which the information actually resides. A particular physical address holding the information may be in main memory or in long term storage such as a hard disk. If the physical address of information sought is in main memory, the information is accessed and utilized by the computer. If the physical address is in long term storage, the information is transferred (usually in a block referred to as a page) to main memory where it may be used. This transfer may necessitate that other information be swapped out of main memory to long term memory in order to make room for the new information. If so, this is accomplished under control of the memory management unit.

The pages referred above are, if fact, the usual means for addressing information. Pages are numbered, and both physical and virtual addresses typically includes a page number and an offset into the page. Moreover, the physical offset and the virtual offset are typically the same. In order to translate between virtual and physical addresses, a basic virtual memory system creates lookup tables which are stored in main memory. These lookup tables store the virtual address page numbers used by the computer. Stored with each virtual address page number is the physical address page number which must be accessed to derive the information. The page number of any virtual address presented to the memory management unit is compared to the values stored in these tables in order to find a matching virtual address page number and retrieve the physical address page number.

There are often several levels of tables, and the comparison takes a great deal of system clock time. For example, to retrieve a physical page address using the lookup tables stored in main memory, the typical memory management unit first looks to a register for the address of a base table which stores pointers to other levels of tables. The memory management unit retrieves this pointer from the base table and places it in another register. The memory management unit uses this pointer to go to the next level of table. This process continues until the physical page address of the information sought is recovered. When the physical address is recovered, it is combined with the offset furnished as a part of the virtual address; and the result is used by the processor to access the particular information desired. A typical lookup in the page tables may take from ten to fifteen clock cycles at each level of the search.

To overcome this delay, virtual memory management systems often include cache memories called translation lookaside buffers (TLBs). A translation lookaside buffer is essentially a buffer for caching virtual page addresses which have been recently used along with their related physical page addresses. Such an address cache works on the same principle as do caches holding data and instructions, the most recently used addresses are more likely to be used than are other addresses. When provided a virtual page address which is stored in the translation lookaside buffer, the translation lookaside buffer furnishes a physical page address for the information without the necessity of consulting the page lookup tables. It is only when the processor sends a virtual page address to the translation lookaside buffer which address is not stored in the translation lookaside buffer that the memory management unit must consult the page lookup tables. When this occurs, the physical page address recovered is stored along with the virtual page address in the translation lookaside buffer so that the next time it is needed it is immediately available. This saves a great deal of time on the next use of the information. For example, accessing the information using a translation lookaside buffer may require only one or two clock cycles compared to hundreds of clock cycles required for a page table lookup.

Presently, computers are designed to use only a single page size; and a designer must choose that size based on certain assumptions about the use of the computer. For example, the storage of a single frame of twenty-four bit color information for the output display requires megabytes of memory space. However, the typical page size utilized in a virtual memory system is four kilobytes. Since each page requires at least one page table translation, the access of a display frame of data requires at least one thousand individual references to the memory management unit to accomplish the translation of the addresses necessary to access the frame buffer in memory. Thus, it would be much more convenient and faster for a computer possessor in dealing with display memory if the data were all to be included in a single page of memory so that the page address translation necessary to display a single frame on the output display could be accomplished for a single page rather than one thousand different pages. On the other hand, if only such large page sizes were to be available, then a very large number of addresses would be wasted since most processes require less than the typical four kilobyte byte page size now utilized.

One way in which the speed of operation of a computer which uses a virtual memory system might be increased would be to allow the virtual memory to utilize many different sizes of pages.

Although it would be desirable to provide multiple page sizes for virtual memory, in order to do so, a system would need to find ways to store different page sizes together in a translation lookaside buffer, to test different page sizes for a hit in the translation lookaside buffer, and to use different size pages to look up addresses. All of these and more are very difficult problems that had not been resolved prior to the present invention.

SUMMARY OF THE INVENTION

It is, therefore, an object of the present invention to provide a memory management unit capable of handling virtual address translations for multiple page sizes.

It is another more specific object of the present invention to provide a memory management unit capable of translating addresses for a virtual memory system which utilizes a very large number of memory page sizes.

These and other objects of the present invention are realized in a memory management unit for a computer using a virtual address system comprising a translation lookaside buffer, and means for comparing a page number of a virtual address for information with a virtual page number stored in the translation lookaside buffer; the translation lookaside buffer including a plurality of positions for storing entries, each of the entries including a first number of bit positions to store a first virtual page number, a second number of bit positions to store an offset into a page, a third number of bit positions to store additional bits which may be part of a page number or part of an offset in a page, a fourth number of bit positions to indicate a size, and a fifth number of bit positions for storing a physical page number; means responsive to a value stored in the fourth number of bit positions for fixing a length of virtual page numbers to be compared by the means for comparing; and means for concatenating the bits of the fifth number of bits, the bits of the third number of bits which are not compared by the means for comparing, and the bits of the second number of bits in order to provide a physical address when a virtual address to be translated matches a virtual address stored in a line of the translation lookaside buffer.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a block diagram illustrating the operation of a conventional memory management unit.

FIG. 2 is a diagram illustrating an addressing format in accordance with the present invention.

FIG. 3 is a block diagram illustrating the features of an memory management unit designed in accordance with the present invention.

FIG. 4 is a diagram illustrating various bit formats used in implementing the memory management unit of FIG. 3 and provides a flow chart of the operation of the method of the invention.

FIG. 5 is a flow chart illustrating the steps of a process in accordance with the present invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Referring now to FIG. 1, there is illustrated a block diagram of a portion of a memory management unit 10 for a virtual memory system designed in accordance with the prior art. In this virtual memory system, a virtual address typically includes a number of high order bits which form a virtual page number and a number of low order bits which constitute an offset value for indexing into the page of memory designated by the page number. For the purpose of this prior art description, a thirty-two bit virtual address and a four kilobyte page are assumed so that twelve bits are required for the offset value.

The memory management unit 10 includes a translation lookaside buffer 12 which is adapted to store virtual page numbers and associated physical page numbers. Since a page of virtual memory and a page of physical memory are typically the same size, the offset value is the same for each. Consequently, the low order offset value need not be included in the comparison or stored in the translation lookaside buffer 12 since the value of the actual offset may be determined from the virtual address being looked up. A comparator 14 receives virtual address page numbers from external circuitry (such as a central processing unit not shown in the figure) and compares those virtual address page numbers to the virtual page numbers stored in the translation lookaside buffer 12.

If the virtual page number bits of a virtual address sought compare to the bits of a valid virtual page number stored in the translation lookaside buffer 12, then the associated physical page number is furnished so that the processor may access that physical page number for the information which is sought. The bits of the physical page number stored in the translation lookaside buffer are combined with the lower order offset bits of the virtual address which is sought to obtain the complete physical address.

If no virtual page number match is found in the translation lookaside buffer 12, then the memory management unit 10 refers to a series of lookup tables which are typically stored in main memory. The reference to the lookup tables begins by taking a value stored in a root table register 15. This value is typically placed in that root table register 15 by the CPU for all addresses associated with a particular process with which the virtual address is associated. This address points to the base of a root table 16 in memory. Some portion of the virtual address such as the high order eight bits are then used to index into that table 16 to access an entry. Typically the data found at that entry position in the root table 16 is another pointer to the base address of another table 17 in memory. A second portion of the virtual address such as the next highest order six bits is used to index into the second table 17 to provide another entry. This entry may again be a pointer to another table 18 stored in memory although in some systems this entry may also contain the physical address of the information sought. Presuming that this is another pointer to a table 18, another six bits of the virtual address may provide an offset into this table 18. At this point in a particular system, the data stored in the entry are the twenty high order bits of the physical address sought.

The bits of the physical page number are combined with the twelve lowest order offset bits of the virtual address to obtain the complete physical address. The virtual page number and the associated physical page number which has been derived are then stored as an entry in the translation lookaside buffer 12 so that the information may be accessed at this physical page. The virtual page address and the physical page address stored in the translation lookaside buffer 12 are now available so that the next time that the translation lookaside buffer 12 is searched for that virtual page address, the physical page address is available without going through the stages of the lookup tables.

As may be seen from the above description, the numbers of bits in the virtual and the physical addresses and the lengths of the virtual and physical page numbers and offsets are fixed and important to the manner in which the memory management unit accomplishes its operations. The number of bits necessary to address a page will vary with the size of the page used in the particular system. For example, if a physical page were to include four kilobytes of memory in a total addressable space of sixty-four megabytes of memory, then there would be many more possible page numbers than if a page were to include a megabyte of memory for the same system. Thus, there must be more bits to designate each of the available pages if a page is four kilobytes than if a page is one megabyte. Moreover, the offset necessary for addressing a particular address within a larger page is larger than is the offset necessary to address a particular address within a smaller page. Thus, the number of bits necessary for offset values will vary with different page sizes.

As pointed out above, it is desirable to be able to address multiple page sizes in the same system. However, multiple page sizes are only useful if pages of different sizes can be utilized on command for the different functions of the computer system. Thus, a large page might be used for storing data to be displayed and a small page used for storing a particular message. If different size pages may be selected for these different uses, then page numbers of different lengths will be stored together in the same translation lookaside buffer of a computer system. If different page sizes are stored at any time in the same translation lookaside buffer, then there must be some way of distinguishing the sizes of those pages so that the correct numbers of bits may be utilized by the memory management unit to accomplish each address translation or lookup. The prior art has not provided any arrangement or method of accomplishing these important functions.

FIG. 2 illustrates the composition of a virtual address used in a memory management unit in accordance with the present invention. Such a virtual address is adapted to support multiple page sizes. Although the total size of the virtual address remains constant, the sizes of the individual fields of the address vary with the sizes of the individual pages involved.

The fields included in the virtual address are a big page field, a variable page field, and a small offset field. For any size page, the big page field and some portion of the variable page field from zero bits up to the total available in the variable page field are used to define the current virtual page address; and the remainder of the variable page field and the small offset field are used to define the current offset value. The total address space remains the same whatever the size of the pages may be. A larger page requires less bits to address the page while the offset within that page requires a larger number of bits. On the other hand, a smaller page requires more bits to address than a large page since so many more page addresses may exist in a given system while the offset within such a smaller page is smaller and requires fewer bits. The big page size field is just large enough to include the number of bits necessary to address the largest page desired, and the small offset field is just large enough to include the number of bits necessary to provide the offset value for the smallest page desired. In the preferred embodiment of the invention, the address length is sixty-four bits, and the page sizes vary between four kilobytes and four gigabytes.

FIG. 3 illustrates the general form of a memory management system constructed in accordance with the present invention to provide memory management in a system utilizing multiple page sizes. The memory management system includes a hardware memory management unit 30 having a translation lookaside buffer 31, a base address register 34, a comparator 35, circuitry 36 for concatenating the physical page number with the offset, and circuitry for joining these individual components together. Associated with the memory management unit 30 but stored in main memory in the preferred embodiment of the invention are a translation storage buffer 32 and a set of translation tables 33.

As with a typical memory management unit, the memory management unit 30 is presented the virtual address sought and compares the upper bits of that address with the upper bits of virtual addresses which are stored in the translation lookaside buffer 31. If the virtual page address is found in the translation lookaside buffer 31, the memory management unit 30 generates a physical address for the information by concatenating the physical page address and the offset for the virtual address. If the virtual page address is not found in the translation lookaside buffer 31, software compares the virtual page address sought with the virtual page address stored in the translation storage buffer 32 using the base address stored in the register 34 to determine whether the virtual address resides therein. If the virtual address is found in the translation storage buffer 32, a physical address is generated in a manner to be explained. If the address is not found, the search for that address is conducted using typical lookup tables. In the preferred embodiment of the invention, this main memory lookup operation is accomplished by system software which is not a part of the present invention and is, consequently, not discussed further.

FIG. 4 illustrates, inter alia, the format of the information stored in the translation lookaside buffer 31 in the preferred embodiment of the invention, a memory management unit for operating with a sixty-four bit address. Also illustrated is the information presented in a virtual address which is to be translated to a physical address. FIG. 5, which is a flow chart illustrating the steps of a process in accordance with the present invention, should be considered in association with FIG. 4 to understand the invention.

The two pieces of virtual address information illustrated in FIG. 4 are compared in the comparator 35 of the memory management unit 30 in the manner herein discussed. The first line illustrated in FIG. 4 is the virtual address which is being sought; this address is presented to the memory management unit 30 by a central processing unit or other device. The virtual address includes the three fields discussed above: the big page field, the variable page field, and the small offset field. Although not shown, the virtual address may also include a context field which indicates the particular process with which the address is associated and typically provides access to a pointer indicating the address of a base lookup table for the addresses of that process. Such an address is placed in the base register 34 of the memory management unit 30 of FIG. 3.

The next line of FIG. 4 illustrates the variable page field. As may be seen, this field is divided into two portions. The portion to the right is masked so that these bits are not considered by the comparator in an attempted match. The bits of the masked portion of the variable page field are utilized in the particular address as the upper bits of the offset into the page. The unmasked portion of the variable page field to the left provides the lower order bits of the virtual page number. This second line of FIG. 4 is included to illustrate the manner in which the variable page field of the particular virtual address is allocated between the page and offset portions of the address.

Line three of FIG. 4 shows the number of bits which are compared for a particular virtual page address in the comparator 35 of the memory management unit 30. As may be seen, the comparator 35 is large enough so that all of the bits of the big page field and the total variable page field may be compared, if necessary. In any comparison, the actual number of bits compared includes the big page field and the portion of the variable page field necessary to make up the entire virtual page number (i.e., the unmasked portion of the variable page field to the left of the mask in the second line). It will be understood that it is necessary for the memory management unit 30 to know the size of the page of the virtual address to generate a mask to accomplish the comparison, and this information is stored as a part of the entry as will be explained below.

Lines four and five of FIG. 4 illustrate the entire entry for the presently preferred embodiment of an address which is stored in the translation lookaside buffer 31. As may be seen, this entry is 128 bits long. Of this, the most significant bit position stores an indication that the entry is valid. To the right of the valid bit is a field large enough to store the page number for the smallest page usable with the memory management unit 30. Since the smallest page requires the longest page number, this field must include enough bits to store both the entire big page field of the virtual address and the entire variable page field. Because this illustration uses a virtual page number which is somewhere between the shortest page number (only the big page field) and the longest page number (the big page field and the entire variable page field), some bits available to store the page number are left unused and are so marked in the figure. To the right of these empty bits of the virtual page number field are five bits which indicate the size of the mask for the variable page field. As may be seen, the five bits of the size field allow up to thirty-two bits to be masked, more than enough for the twenty bits used for the variable page field. In a comparison by the comparator 35 of the memory management unit 30, the number stored in the size field causes a mask generator circuit 37 to generate a mask for the comparator so that the variable page field is correctly chosen for the address which is stored in the line of the translation lookaside buffer 31 and is being compared. That the size of the mask is controlled by the size value stored in the size field shown in line four of FIG. 4 is indicated by the dotted line running from the size field in line four to the mask shown in line two.

To the right of the size field of line four and at the beginning of line five of FIG. 4 are a number of unrelated bits. These unrelated bits are reserved for future extensions which are not related to the present invention and are therefore not discussed here. To the right of the unrelated bits in line five are a number of bits (forty in the preferred embodiment of the invention) which store the physical page number. To the right of the physical page number field are a number of bits labelled soft and allocated to the software programmer. Finally, to the right of the soft field is a field including a number of bits which are used to store protection information.

When the virtual page number indicated by the big page field and the unmasked portion of the variable page field match the same bits of a virtual page number stored in the translation lookaside buffer 31, there is a hit in the translation lookaside buffer 31. This causes the memory management unit 30 to use the circuitry 36 to generate a physical address which is the concatenation of the physical page number, the previously masked least significant portion of the variable page field, and the bits of the small offset field. The physical page frame number points to the physical page at which the desired information is stored, and the lower order (previously masked) bits of the variable page field concatenated at the high end to the small offset field provide the actual page offset. This value is illustrated in the sixth line of FIG. 4.

The portion of the memory management system discussed to this point utilizing the translation lookaside buffer 31 may be utilized as a basic memory management unit when combined with the previously discussed software lookup tables of the prior art. By utilizing the root table pointer provided by the context value referred to above and selected bits of the virtual address as offsets into the software tables, an effective system is provided for dealing with the translation of virtual addresses to physical addresses. To this point in the explanation all of the individual elements other than those specifically described may be constructed in a manner well known to the prior art.

However, the present invention may also be enhanced in order to provide more rapid translation by utilizing the software translation storage buffer 32. The software translation storage buffer 32 provides additional storage to assist the translation lookaside buffer 31 while allowing the buffer 31 to maintain a minimum size. In general, except as otherwise mentioned, the translation storage buffer 32 stores the same data in its entries as does the translation lookaside buffer 31. When a miss occurs in the translation lookaside buffer 31, the system functions in a manner unlike any other memory management system.

It will have been noted by those skilled in the art that the actual size of the page of the virtual address and of the offset are both determined by the value stored in the size field of the translation lookaside buffer 31. Consequently, if a miss occurs in the translation lookaside buffer 31, the page size for which a search is being conducted is unknown. Thus, the portion of the virtual page address to be utilized for comparison with the virtual page values stored in the translation storage buffer 32 is unknown. In order to undertake a comparison of the current virtual address which is being sought with virtual page values stored in the translation storage buffer 32, the present invention uses an assumed value of virtual page size (referred to as assumed page size) to conduct the comparison. This assumed value is a function of the particular system but, in general, is between the minimum and the maximum page sizes available. The virtual page numbers stored by the translation storage buffer 32 reflect pages which are of this assumed page size.

The current page size of any virtual address which is sought can be smaller than, equal to, or larger than the assumed page size. Consequently, the current page number can be longer than, equal to, or shorter than the assumed page size. This is illustrated on the seventh line in FIG. 4. The virtual page numbers stored in the translation storage buffer 32 held in memory are of the same assumed page size. Consequently, the actual current page size (line seven of FIG. 4) can only be the same as the assumed page size, larger than the assumed size, or smaller than the assumed size.

As discussed in the previous paragraph, the current page size is unknown when a translation lookaside buffer miss occurs because the size information is stored in the translation lookaside buffer 31. Consequently, the assumed page number (rather than the current page number) portion of the virtual address is compared against the assumed page numbers stored in the entries in the translation storage buffer (line 8 of FIG. 4). If the assumed page number of the current address matches an assumed page number stored in the translation storage buffer, there is a hit; and the current page size may be determined from the size field of the entry in the translation storage buffer 32.

If the current page size is smaller than the assumed page size, then the current page number will be longer than the assumed page number stored in the translation storage buffer 32 by P bits (see line seven of FIG. 4), where P is the difference between the length of the current page number and the length of the assumed page number. Consequently, a number of possible entries may match the assumed virtual number. In fact, there will be two to the power P consecutive pages with the same size as the current page which is smaller than the assumed page size. These pages will all share one entry in the translation storage buffer 32.

In order to differentiate between these pages and select the proper page, the matching entry with the assumed page number in the translation storage buffer stores a pointer (line nine of FIG. 4) to another table 33 called a translation table. Thus, the entry in the translation storage buffer 32 (lines 8 and 9 of FIG. 4) contains the size of the actual address and a pointer to the translation table entry which includes the remainder of each of the possible virtual page numbers. At the translation table address pointed to, two to the power P entries are stored, one for each page that uses the particular translation storage buffer entry (as is shown in line ten of FIG. 4).

The P least significant bits of the current page number (where P is the amount by which the assumed page number is less than the current page number—see line seven of FIG. 4) are then used to select one entry out of the $2^P$ entries. For example, if the P least significant bits of the current page number equal 0, entry 0 is selected. If the P least significant bits of the current page number equal 1, entry 1 is selected and so on. The selected entry then provides the physical page number which is sought. The actual physical address is generated by the concatenation of parts referred to above in the discussion of the translation lookaside buffer 31. The virtual and physical page numbers are then stored in the translation lookaside buffer 31 for future address translations.

If the current page size is larger or equal to the assumed page size, then the current page number will be shorter than or equal to the assumed page number stored in the translation storage buffer entry. Consequently, the translation storage buffer entry that matches the assumed page number of the current address can only be used by this page whose size is bigger than or equal to the assumed page size. Therefore, there is no need to store a pointer in the translation storage buffer 32 as was done in the previous case of a longer current page number. Instead, the physical page number and other related information can be stored directly in the translation storage buffer entry. This is illustrated in lines eleven and twelve of FIG. 4. Again, the final physical address is compiled by concatenating the physical page number stored in the translation storage buffer entry, the lower order bits of the variable page field which are included in the offset, and the value in the small offset field of the virtual address being sought. Finally, the virtual and physical addresses are stored in the translation lookaside buffer for future address translation.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A memory management unit for a virtual address system comprising:

a translation lookaside buffer including a plurality of positions for storing translation entries, each of the translation entries including a first number of bit positions to store a first virtual page number, a second number of bit positions to store an offset into a page, a third number of bit positions to store additional bits each of which additional bits may be either a part of a virtual page number or part of an offset into a page, a fourth number of bit positions to indicate a size, and a fifth number of bit positions for storing a physical page number;

means for comparing a virtual page number of a virtual address for information with a virtual page number stored in the translation lookaside buffer;

means responsive to a value stored in the fourth number of bit positions for fixing a length of virtual page numbers to be compared by the means for comparing;

means for concatenating the bits of the fifth number of bits, the bits of the third number of bits which are not compared in the comparator, and the bits of the second number of bits to provide a physical address when a virtual address to be translated matches a virtual address stored in an entry of the translation lookaside buffer; and a second translation lookaside buffer in memory for providing additional translation entries when a virtual address to be translated does not match a virtual address stored in the translation buffer, the second translation lookaside buffer being capable of storing together entries of different sizes, the entries of different sizes in which a virtual page number is not greater than an assumed length including a virtual page number, a virtual page number length, and a physical page number, and the entries of different sizes in which a virtual page number is greater than an assumed length including an assumed virtual page number, a virtual page number length, and a pointer to a number of entries having the same assumed virtual page number.

2. A memory management unit of a virtual address system as claimed in claim 1 in which the pointer to a number of entries having the same assumed virtual page number for entries in which the virtual page number is greater than an assumed length points to an entry in a table in memory.

3. A memory management unit of a virtual address system as claimed in claim 1 in which the means responsive to a value stored in the fourth number of bit positions for fixing a length of virtual page numbers to be compared by the means for comparing comprises means for masking the number of bit positions compared by the means for comparing.

4. A method for translating virtual addresses having variable virtual page sizes and variable offset sizes stored together to physical addresses in a memory management unit for a virtual address system comprising the steps of:

(a) comparing a number of bits of a virtual address to be translated with entries stored in a first translation lookaside buffer, the number of bits of the virtual address and each entry being compared being controlled by a value stored in each of the entries;

(b) providing a physical page number when the compared bits of a virtual address and an entry are the same; and (c) obtaining a physical page number from a second translation lookaside buffer in memory when the compared bits of a virtual address and an entry are not the same;

wherein step (c) includes the steps of comparing entries in the second translation lookaside buffer with a virtual page address, wherein a portion of a virtual address having an assumed length is compared with a portion of an entry in the second translation lookaside buffer of the same length, deriving a length value when a comparison occurs, generating a physical address if the length value is not greater than the assumed length, and generating a pointer to one of a series of physical addresses if the length value is greater than the assumed length.

5. A method for translating virtual addresses having variable page and offset sizes stored together to physical addresses in a memory management unit for a virtual address system as claimed in claim 4 further comprising the step of placing a virtual page address and a physical page address obtained from a second translation lookaside buffer in memory in an entry in the first translation lookaside buffer.

6. A method for translating virtual addresses having variable page and offset sizes stored together to physical addresses in a memory management unit for a virtual address system as claimed in claim 4 wherein in step (a) the number of bits of the virtual address compared varies from a minimum number designating a largest possible page size to a maximum number designating a minimum possible page size.

7. A method of translating virtual addresses having variable page and offset sizes stored together to physical addresses in a memory management unit for a virtual address system as claimed in claim 4 in which the step of obtaining a physical page number from a second translation lookaside buffer in memory when the compared bits of a virtual address and an entry are not the same comprises the further steps of obtaining a physical page number from lookup tables stored in memory.

8. A method for translating virtual addresses having variable page and offset sizes stored together to physical addresses in a memory management unit for a virtual address system as claimed in claim 4 in which the step of comparing a number of bits of a virtual address to be translated with entries stored in a first translation lookaside buffer comprises comparing a number of bit positions equal to a first number of bit positions sufficient to indicate a first maximum page size and a second number of bit positions sufficient when combined with the first number to provide the complete virtual page for a page size of the virtual page address sought.

9. A method for translating virtual addresses having variable page and offset sizes stored together to physical addresses in a memory management unit for a virtual address system as claimed in claim 4 in which the step of comparing a number of bits of a virtual address to be translated with entries stored in a first translation lookaside buffer comprises comparing a number of bit positions equal to a first number of bit positions of a number large enough to indicate a first maximum page size, and some portion of a second number of bit positions, which second number of bit positions are large enough when added to the first number to provide a second minimum page size for a complete virtual page address.

10. A method for translating virtual addresses having variable page and offset sizes stored together to physical addresses in a memory management unit for a virtual address system as claimed in claim 9 in which the value stored in each of the entries controls a number of bit positions of the second number of bit positions which are compared.

11. A method for translating virtual addresses having variable page and offset sizes stored together to physical addresses in a memory management unit for a virtual address system as claimed in claim 10 in which the step of comparing a number of bit positions comprises using the value stored in each of the entries to mask bits stored in the second number of bit positions.

12. A method for translating virtual addresses having variable page and offset sizes stored together to physical addresses in a memory management unit for a virtual address system as claimed in claim 10 in which the step of obtaining a physical page number from a second translation lookaside buffer comprises concatenating a physical page address derived with a portion of the second number of bits of the entry not used in the comparison and with bits from the virtual address indicating an offset into a minimum sized page.

\* \* \* \* \*